FIG.I

United States Patent Office 3,034,004
Patented May 8, 1962

3,034,004
HIGH-DUTY INSULATION IN SEALED ELECTRIC MOTORS SUBJECTED TO REFRIGERANTS, OILS OR THE LIKE
Hans-Ludwig von Cube, Schriesheim an der Bergstrasse, and Irmhild Sauerbrunn, Mannheim, Germany, assignors to Brown, Boveri & Cie Aktiengesellschaft, Mannheim, Germany, a corporation of Germany
Filed Apr. 24, 1958, Ser. No. 730,597
10 Claims. (Cl. 310—87)

Our invention relates to hermetically sealed electric motors whose insulating components are exposed to refrigerants or lubricants or mixtures thereof, and, in one of its particular aspects, to high-duty insulation in sealed compressor-motor units for refrigerators operating with refrigerants formed of halogenated hydrocarbons.

Motor-compressor units for refrigerating purposes are known in which the electric motor is mounted, together with the compressor, within a pressure-resistant capsule that forms part of the refrigerant circulation system. This eliminates the need for the shaft seals required in ordinary compressors and also reduces mechanical power losses by doing away with the additional motor bearings and the coupling between motor and compressor otherwise required. Such sealed motor-compressor units also are preferable because of the reduction in material and space requirements.

However, the design and manufacture of such units involves considerable difficulties particularly as regards the exacting requirements to be met by the insulating components of the assembly; and it is a main object of our invention to greatly reduce or virtually eliminate these difficulties.

The invention will be further described with reference to the drawings in which.

Figure 1:
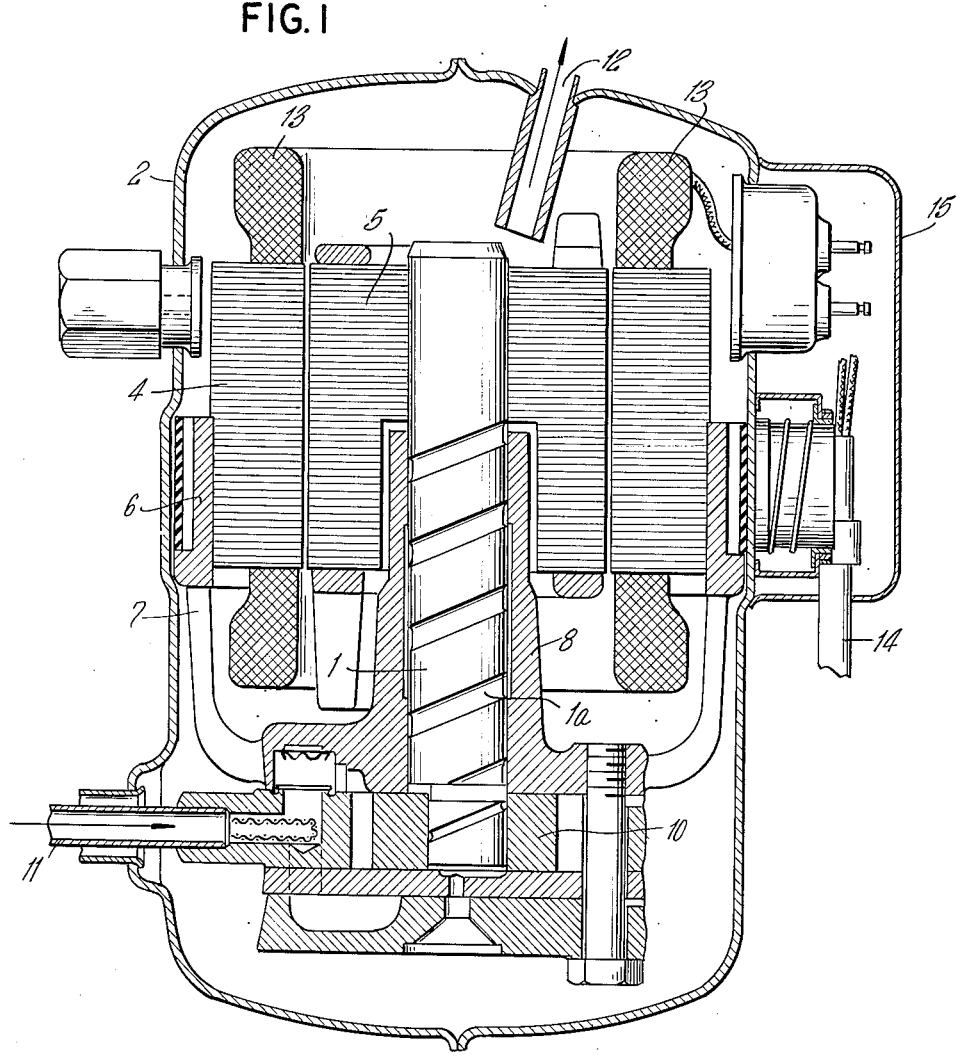
FIG. 1 shows, by way of example, an axial, sectional view of an embodiment of a sealed motor-compressor unit.

According to FIG. 1, the motor-compressor shaft 1 is centrally located in a hermetically sealed housing 2 which also encloses the stator 4 and the rotor 5 of the motor. The laminated stator 4 is mounted on a rigid ring structure 6 joined by spider arms 7 with a bearing structure 8 in which the shaft 1 is journalled. Shaft 1 drives a rotary compressor 10 which receives gaseous refrigerant through an inlet conduit 11 and passes compressed refrigerant into the interior of the housing 2 and out of an outlet conduit 12. The bottom portion of the housing 2 is filled with oil, and the shaft 1 has a helical groove 1a to act as a lubricating pump which delivers the oil from the bottom of the housing to the points of the bearing structure 8 to be lubricated, whence the oil returns back to the bottom. The stator winding 13 is energized from an electric cable 14 through electric control and terminal members located in a junction box 15.

Figure 2:
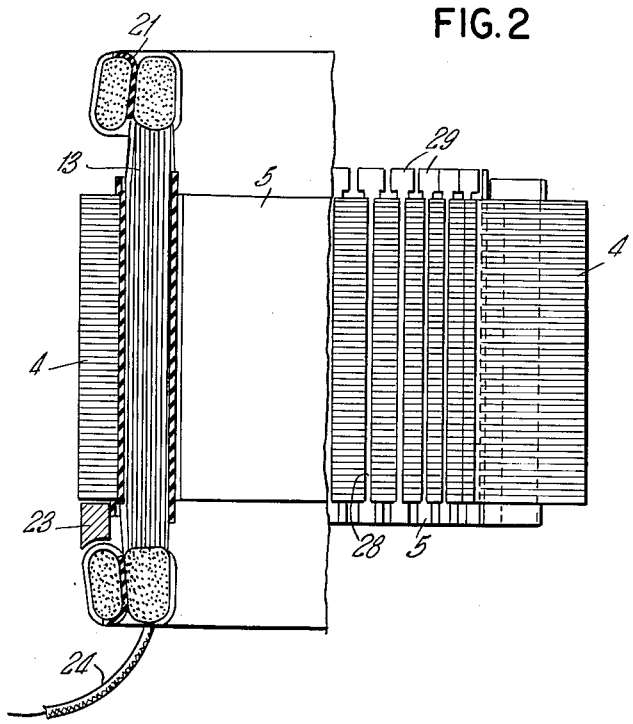
FIG. 2 shows in its left portion an axial section through the stator, and in its right portion an axial section through the rotor of the motor.
Figure 3:
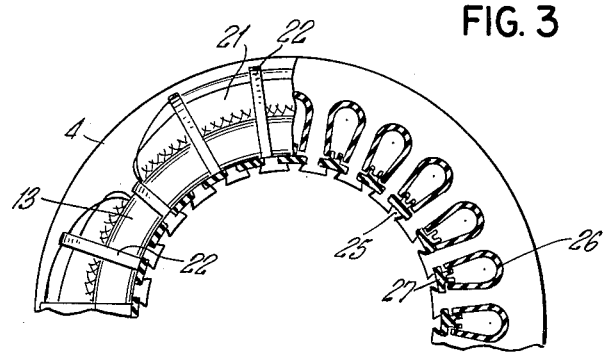
FIG. 3 shows in its left portion a partial front view of the stator and in its right portion a radial section of the stator.

Sealed electric motors or motor-compressors of the general type exemplified by the above-described example, comprise a number of insulating components for various purposes at various localities exposed to the refrigerant or the oil or mixtures of refrigerant and oil. Examples of such insulating components are shown in FIGS. 2 and 3. The stator winding 13 is provided with intermediate spacer layers or shims 21 of insulating material and is also secured and tightened by means of insulating bandages 22. Supporting wedges 23 are located between the protruding end of the stator winding 13 and the laminated stack of the stator 4 for the purpose of bracing the component parts so that they form a rigid entity together with the stack. The supply cable 24 is likewise provided with an insulating sheath or hose exposed to the oil or refrigerant. The slots 25 of the stator 4 have insulating linings 26 and are closed by insulating slot closures 27. The rotor 5 has its slots 28 also closed by insulating closure wedges 29.

All materials located within the coolant cycle of a refrigerating or similar system must be resistant to attack by the refrigerant. This applies particularly to the insulating components of the electric motor. Such components must not become corroded or dissolved within the refrigerant and must not have any detrimental effect upon the refrigerant or lubricant. Furthermore, the mechanical or electrical properties of such components should remain unaffected by the refrigerant or lubricant.

The entire motor-compressor unit must also remain free of dirt, lint or temporarily soluble extracts to secure proper functioning of the refrigerating cycle, to avoid clogging by precipitating substances, formation of resins and the like disturbances. The insulating components of the motor, therefore, should be as free as possible of lint, fibers and extraction substances.

The oil located within the motor-compressor unit and necessarily reaching the motor, is also subjected to the refrigerant and to the influence of any other substances that may be contained in the motor and in the refrigerant circulation. The oil cannot be changed because generally such units are permanently sealed by welding and cannot be opened during the useful lifetime of the unit. Consequently, exacting requirements must be met as to resistance to aging of the oil. This requires an absolutely neutral behaviour of the materials used in the refrigerant circulation, particularly of the insulating components of the motor, to the extent their deterioration may impair, or accelerate aging of, the oil.

For these reasons, there have been adopted concretely observable empirical standards and expedients relative to such motors and their insulating materials, these expedients being substantially the same with all manufacturers of such motors, aside from slight modifications.

Thus, the windings of the motor are made of varnish-insulated wires whose various varnish coatings have in common a high resistance to being dissolved by the refrigerant, aside from satisfying other requirements of electrical and mechanical nature applicable to such wires. The other insulating materials known and conventionally used in such motors are formed on the basis of naturally grown cellulose-containing raw materials. Generally used as binding material are cotton, flax or cell wool. Used as insulating material for slot linings, slot closures, and shims or intermediate layers is a compressed material made of cellulose, cotton rags or similar materials.

These insulating materials must satisfy certain requirements as to their content of extractable substances. If necessary, therefore, the insulating materials are liberated from such extraction substances by suitable treatment prior to using them in the motor. Such insulating materials must also be substantially free of fibers; that is, they must exhibit a fiber-free cross section or must be liberated from any fiber content by suitable pre-treatment. However, all such cellulose-containing insulating materials have in common that they give off their cell water while the residual substance becomes simultaneously carbonized when the materials are subjected to temperatures above 105° C., such deterioration commencing slowly but increasing at a more rapid rate of change with increasing temperature. The cell water is extremely detrimental within the refrigerant circulation system because it may cause freezing of the regulating devices and promotes chemical disassociation of the refrigerant-oil mixture. The resulting carbon particles, due to their large surface, act partly as a catalyst which promotes aging of the oil.

It has therefore been an indispensable manufacturing requirement to design the motor-compressor units, as regards their heat dissipation, so that the motor cannot become heated above 105° C. under severest operating conditions.

It is further common to the cellulose-containing insulating materials that they contain a relatively high moisture of equilibrium, i.e. moisture originating from ambient air and hygroscopically bonded to the fibrous body.

When manufacturing the motor-compressor units, care must be taken to secure a highest degree of dryness of the finished machine. The drying is effected at elevated temperatures, likewise limited by the commencing separation of cell water, and in most cases in vacuum. The drying operation requires supplying a considerable amount of power because the occurring quantity of water vapor is rather large, corresponding to approximately one-tenth of the weight of the insulating materials used; and this also prolongs the drying period for a given power of the vacuum pump and given cross sections of the suction conduits.

In summary, the cellulose-containing insulating materials heretofore used in refrigerant-resistant, sealed motors, although generally satisfying the basic requirements to be met, have forced the designer and manufacturer to observe a number of limitations predicated upon the properties of such materials. The most essential limitations are: the applicable limit of the operating and drying temperature and hence the necessity of giving the motors a larger size, employing prolonged drying periods, and still incurring the danger that any short-lasting overheating of the motor under abnormal operating conditions may result in disassociation of cell water with the detrimental effects above mentioned.

It is therefore a more specific object of our invention to eliminate the above-described deficiencies of the conventional insulating materials in hermetically sealed electric motors.

To this end, and in accordance with a feature of our invention, we provide the sealed motor with insulating components which consist exclusively of cellulose-free synthetic plastics inert to refrigerant and oil at temperatures above 130° C. and up to a maximum of about 150° C. That is, all insulating components of the sealed motor that are, or may become, exposed to the refrigerant and/or lubricant are made of synthetics incapable of detrimentally reacting with the refrigerant or lubricant up to the temperature limit of 150° C.

We are aware of the fact that the use of synthetics, as such, was known for other types of motors for the purpose of locally utilizing a particular property of the synthetic material. However, it is essential for our invention to use not only the particular synthetics above specified but to also employ them systematically throughout the motor design in order to exclude the detrimental effects, generally expectable with synthetic plastics, relative to the refrigerant circulation system and its permanence.

According to other aspects and features of our invention, we do not simply substitute the conventional cellulose-containing insulating materials in sealed motors by synthetics satisfying the heretofore usual temperature limitations and the heretofore known behaviour relative to moisture; but we also aim, to the extent necessary, toward finding a pre-treatment of the insulating materials which affords a considerably higher temperature of continous motor operation and thus also a better utilization or higher efficiency of the driving motor, while also maintaining or making the synthetic material resistant to refrigerant and oil, with the further requirement that these insulating materials are suitable for a simple and rapid drying process by virtue of a minimum water content. It is also essential as mentioned, that all cellulose-containing insulating components in the motor must be substituted by those satisfying the requirements of our invention.

The above-mentioned feature of our invention to make all insulating components of the sealed motor exclusively of synthetic materials as specified, still leaves room for selecting the particular synthetic in dependence upon other desiderata such as its extrudability, weldability and other mechanical or fabricating properties.

As mentioned above, the use of synthetic plastics in electric motors is not novel as such. We are also aware of the fact that in refrigerant-resistant motors for use in sealed capsules, synthetic materials have already been used for certain components, namely for insulation of wires. However, the objects of our invention cannot be satisfied by making only a few components of synthetic material. It is rather necessary to entirely avoid the use of the conventional cellulose-containing materials wherever these materials, during operation of the motor, become exposed to refrigerant or oil. This is so because in order to permit the desired increased temperature loading or increased efficiency of the motor, it must satisfy a number of specific properties. That is, the motor must be completely free of fibers at all localities exposed to refrigerant or oil; it must possess and retain a minimum dirt content (for example less than 2 milligrams for a motor of one-eighth H.P.), aside from a minimum content of extraction substances (up to at most 0.1% by weight of the insulating substances); and it must nowhere enter into detrimental reaction with the refrigerant or lubricant, which is tantamount to requiring all materials of the motor, individually and in combination, to be inert relative to such reaction. All these insulating materials of the motor, individually or in combination, must not cause the deposition of copper on parts of the compressor and no disassociation of the refrigerant resulting in the separation of Cl-ions.

As a rule, not all synthetics applicable for the purpose of our invention are equally well suitable for use as slot lining 26, slot closure 27, 29, bandage 22, supporting wedge 23 and insert 21. As known and customary, a distinction must also be made relative to other than insulating properties, namely suitability of the synthetic material for being fabricated into foils, or into endless threads that can be spun into strands, or its suitability for injection molding or extrusion or punching of parts.

We have found that a number of synthetic materials already in use for insulating purposes, are applicable in accordance with our invention under considerably more exacting conditions than was known. This is so because the objections generally raised to the use of synthetic insulation in capsuled refrigerant compressor motors become obviated if the compressor and the synthetic substances are inherently, or by virtue of pre-treatment, free of any components capable of subsequent detrimental chemical or physical reaction with the refrigerant or lubricant. Any such pre-treatments must be so conducted that all constituents that may be become segregated at the maximum operating temperature, are eliminated beforehand and thus can no longer become effective in the refrigerant circulation system or have assumed stabilized mechanical and thermal properties in the entire temperature range up to the maximum operating temperature. A choice of the materials that may react with each other within the refrigerant circulation can be so made that at the pressure and temperature conditions of normal operation, no chemical dissociation and particularly no splitting-off of water will occur so that the desired resistance of the materials relative to refrigerant and lubricant is secured.

All these conditions are satisfied if according to our invention the entire insulation of the sealed motor, such as the slot linings 26, the slot closures 27, 29, the bandages 22, the intermediate layers or inserts 21, the supporting wedges 23 as well as the winding insulation and the insulating cable sheaths or hoses 24 are made exclusively of cellulose-free, electrically insulating synthetics that do not detrimentally react with refrigerant and lubricant at temperatures above 130° up to a maximum of 150° C. Among the synthetics to be chosen may be those that are inherently inert, i.e. do not produce detrimental chemical reactions with the refrigerant and lubricant in the stated temperature range.

However, it is also possible to liberate the synthetics used for the insulation from their monomer and low-molecular constituents by artificial aging, irradiation, washing or extraction, thus converting them to a state in which they cannot cause detrimental chemical reactions with refrigerant and lubricant in the above-mentioned temperature range.

Described in the following are a number of examples of suitable synthetic materials and their desirable pre-treatment, to make these materials suitable for use according to the invention, in a compressor-motor unit of a system employing halogenated hydrocarbons as refrigerant and lubricating oil, under exclusion of oxygen and moisture.

The bandages 22, intermediate layers 21 or insulating hoses 24 may be made of foils or threads formed of polyethylene-terephthalate. In this case, the monomers must be separated by artificial aging and must then be removed by a subsequent treatment, preferably by washing or stripping off in a suitable solvent, for instance trichlorethylene. For example, we have used the following method for thus eliminating the monomers from polyethylene-terephthalate foils.

The monomers segregate on the foil surface as a white coating. This takes place after a certain period of time, even if the material is simply stored at room temperature. For promoting the segregation, we stored the foils 24 hours in a furnace at about 130° C. The monomer coating resulting from the hot storing was stripped off between two cheeks covered by felt impregnated with trichlorethylene. The artificial aging can also be performed at a somewhat higher temperature, for example at 150° C. The monomer coating can also be removed by first immersing the foils in trichlorethylene and then mechanically stripping the coating.

The above-mentioned insulating components of the motor may also be made of endless threads of polyacrylonitrile, polyethylene-terephthalate, or polyamide, these threads being spun to strips or hoses. In this case, these insulating parts must not be cut mechanically but must be severed thermally so that the resulting fusing or welding of the cut edges avoids the formation of fibers at such edges.

Linear polyamides are suitable for making the bandages, insulating layers and insulating hoses, but only if they are substantially free of softeners. That is, any amount of softening agent should be within the range of substantially 0.0% to about 0.5%, and such softeners must not contain catalytically acting groups.

We have found that, as far as slot linings 26, slot closures 27, 29 and other insulating parts produceable by injection molding or extrusion are concerned, such parts can be made of polyamide, polyvinylcarbazole, polyurethane or the like. The parts can be made of these substances in form of individual pieces, or also as coherent, integral bodies of proper overall shape and size. The latter possibility is particularly advantageous. In some cases it is also possible to produce the insulation of the sealed motor to a large extent from one and the same synthetic material as the base substance.

When using polyamide foils for slot linings, the monomers are eliminated, not by the thermal aging described above with reference to polyethylene-terephthalate foils, but preferably by extracting them from the finished, shaped part. For this purpose we performed the extraction in a Soxhlet apparatus with alcohol for a period of three hours to produce the desired results. As a rule, it is not desirable to extract the monomers from the pulverulent or granular raw material because the subsequent production of the shaped parts or foils from the powder again requires the application of heat which may often cause renewed cracking of the high-molecular compounds.

Polyvinylcarbazole is particularly suitable for slot linings, closures and other injection-molded or extruded parts if the monomers are to largest possible extent vaporized and removed by vacuum treatment.

If polyethylene is used for injection-molded or extruded components then, as has been found, the required thermal and mechanical properties can be attained by electron irradiation. When using polyamides for such components, the corresponding effect can also be produced by subsequent mechanical treatment, for example by stretching.

After subjecting the above-mentioned substances to pre-treatment for eliminating the monomers, the insulating substances are similarly applicable for obtaining a higher loadability of other motors or power windings, for example in transformers or the like, in which the access of air or oxygen and moisture is prevented by capsuling and the insulating components within the capsule are subjected to lubricant. The invention therefore is not limited to compressor-motor units for refrigerating purposes, although the latter use represents the preferred field of application and offers particularly outstanding advantages.

We claim:

1. In an electric power device comprising electric windings and insulating components and having a capsule sealing said winding and components from oxygen and moisture and containing a medium selected from halogenized hydrocarbon coolant and lubricant substances to which said components are exposed, said insulating components consisting exclusively of cellulose-free, electrically insulating synthetic plastics inert relative to said medium at temperatures above 130° C. up to about 150° C. maximum.

2. A refrigerating motor-compressor unit, comprising a motor having electric conductors and insulating components, said components comprising insulation on said conductors, slot linings, slot closures, and parts for retaining said conductors, a capsule hermetically enclosing said motor and sealing it from oxygen and moisture, said capsule containing lubricant substance and a refrigerant formed of halogenated hydrocarbon substance, said components being exposed to at least one of said substances and consisting exclusively of cellulose-free, electrically insulating synthetic plastics inert relative to said medium at temperatures above 130° C. up to about 150° C. maximum.

3. In a device according to claim 1, said insulating components consisting exclusively of synthetic polymers substantially free of monomer constituents.

4. In a device according to claim 2, said conductors comprising a motor winding, and said parts comprising bandages and inserts for retaining said winding, said bandages and inserts consisting of artificially aged polyethylene-terephthalate substantially free of monomers.

5. In a device according to claim 1, said insulating components comprising parts consisting of polyamides having a softener content of from 0.0% to about 0.5% by weight, said softener content being free of catalytically active groups.

6. In a device according to claim 1, said insulating components comprising parts consisting of high-molecular polyamides free of monomeric and low-molecular constituents and free of hydrolysis-causing water.

7. In a device according to claim 1, said insulating components comprising parts consisting of polyvinylcarbazole substantially free of monomers.

8. In a device according to claim 1, said insulating components comprising parts consisting of mechanically pre-stressed high-molecular polyamides substantially free of monomers.

9. In a device according to claim 1, said insulating components comprising parts consisting of electron-irradiated polyethylene.

10. In a device according to claim 1, said insulating components comprising parts consisting of spun strands of substance selected from the group consisting of polyacrylonitrile, polyethylene-terephthalate and polyamide, said strands having fiberless, fused edges.

References Cited in the file of this patent
UNITED STATES PATENTS

| | | |
|---|---|---|
| 2,192,654 | Simons | Mar. 5, 1940 |
| 2,318,786 | Korte et al. | May 11, 1943 |
| 2,352,958 | Lauer et al. | July 4, 1944 |
| 2,734,934 | McKnight | Feb. 14, 1956 |
| 2,763,798 | Kriss et al. | Sept. 18, 1956 |

OTHER REFERENCES

A.I.E.E. Publication: Technical Paper 52–69, L. C. Parker, "Application of Motors to Household Refrigeration Compressors," December 1951, 16 pages.